United States Patent
Luna

(10) Patent No.: US 9,186,946 B2
(45) Date of Patent: Nov. 17, 2015

(54) VEHICLE SUSPENSION WITH X-LINKAGE

(75) Inventor: Gonzalo Luna, Lake Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1454 days.

(21) Appl. No.: 12/391,321

(22) Filed: Feb. 24, 2009

(65) Prior Publication Data

US 2010/0213682 A1    Aug. 26, 2010

(51) Int. Cl.
*B60G 9/00* (2006.01)
*B60G 7/00* (2006.01)
*B60G 11/27* (2006.01)

(52) U.S. Cl.
CPC ........ *B60G 9/00* (2013.01); *B60G 7/001* (2013.01); *B60G 11/27* (2013.01); *B60G 2200/30* (2013.01); *B60G 2200/345* (2013.01); *B60G 2204/143* (2013.01); *B60G 2206/121* (2013.01)

(58) Field of Classification Search
USPC ............ 280/124.107, 124.135, 124.111, 280/124.116, 124.128, 124.11, 124.104, 280/124.156; 267/247

See application file for complete search history.

(56) References Cited

U.S. PATENT DOCUMENTS

| | | | | |
|---|---|---|---|---|
| 2,110,819 | A | | 3/1938 | Poirier |
| 2,742,302 | A | * | 4/1956 | Pointer ................. 280/124.111 |
| 3,007,715 | A | * | 11/1961 | Maharick ............... 280/124.116 |
| 6,129,367 | A | * | 10/2000 | Bublies et al. ......... 280/124.107 |
| 6,308,971 | B1 | | 10/2001 | Mikaelsson et al. |
| 6,527,286 | B2 | * | 3/2003 | Keeler et al. ........... 280/124.135 |
| 6,808,191 | B1 | | 10/2004 | Buhl et al. |
| 7,543,833 | B2 | * | 6/2009 | Lundmark ............... 280/124.13 |
| 7,753,384 | B2 | * | 7/2010 | Kunze et al. ........... 280/124.116 |
| 2006/0244236 | A1 | | 11/2006 | Cortez et al. |
| 2009/0256328 | A1 | | 10/2009 | Dudding et al. |
| 2010/0007110 | A1 | * | 1/2010 | Lie .......................... 280/124.111 |
| 2010/0213682 | A1 | * | 8/2010 | Luna ...................... 280/124.153 |

* cited by examiner

*Primary Examiner* — Karen Beck
(74) *Attorney, Agent, or Firm* — Brooks Kushman P.C.

(57) ABSTRACT

A vehicle suspension includes an X-linkage with a central body, a first set of legs extending outwardly from the central body in one direction, and a second set of legs extending outwardly from the central body in an opposite direction to form an X-shape. The first set of legs is rigidly attached to an axle and the second set of legs is pivotally connected to a frame with frame hangers.

12 Claims, 2 Drawing Sheets

VEHICLE SUSPENSION WITH X-LINKAGE

TECHNICAL FIELD

The subject invention relates to a vehicle suspension with an X-linkage that provides roll and lateral stiffness.

BACKGROUND OF THE INVENTION

Suspension systems are utilized on vehicles to provide ride comfort and desired handling characteristics. Various types of suspensions are known that utilize multi-link configurations, spring configurations, or a combination of both air spring and spring configurations.

One known suspension system comprises a multi-link (parallelogram) air suspension that is typically utilized on a front axle. This system includes three or more longitudinally extending linkages that attach the front axle to a chassis. A transverse torque rod attaches the front axle to the chassis via a cross member. The transverse torque rod is required to provide lateral stiffness to the system. The primary suspension components that support the sprung mass are air springs. Secondary roll stiffness is provided by a roll bar. This type of system is typically used as a leading arm suspension due to gear box steering systems positioned in front of the axle.

Disadvantages with this type of system include a high number of components and associated connection points. Further, the high number and types of components (e.g., the multiple longitudinal linkages, the transverse torque rod, a cross-member required to connect the torque rod to the chassis, and the roll bar) make this system very heavy.

Another type of front suspension comprises a spring suspension that includes one or more spring leaves that are attached to the front axle. The spring leaves constrain the axle longitudinally and laterally. Primary roll stiffness is provided by the spring leaves and secondary roll stiffness is provided by other spring components and roll bars. The primary suspension components are the spring leaves themselves, which support the sprung mass.

Disadvantages with this type of system include too high of a vertical rate, a higher brake diving (reaction to braking), and variations in ride height. A natural frequency, or vertical rate, of this type of system tends to be higher than a desired vertical rate. Further, ride height of the vehicle changes as the suspension (spring) is loaded, which is not desirable.

Another type of front suspension comprises a hybrid system that uses both air springs and spring leaves. The spring leaves constrain the axle longitudinally and laterally to the chassis. Primary roll stiffness is provided by a combination of the spring leaves and the air springs, while secondary roll stiffness is provided by roll bars, front spring geometry, spring bushings, other spring components, and/or torsional rigidity of the axle itself. Both the air springs and spring leaves support the sprung mass. Disadvantages with this type of system involve a higher brake diving and too high of a vertical rate as discussed above.

One example of a known rear suspension is a system that uses coil springs and/or air springs to support the sprung mass of a tandem axle. This type of system can be a leading or trailing arm configuration and can include multi-links for a parallelogram configuration. An X-linkage or torque box component provides secondary roll stiffness and lateral stiffness to the suspension and eliminates the need for a transverse torque rod. The X-linkage or torque box component has one or more bushings that pivotally connect to both the axle and a frame hanger.

All of the suspension systems set forth above require a significant amount of packaging space on the vehicle. Spring suspensions use long spring leaves to provide adequate vertical rate (frequency or ride comfort) while multi-link suspensions use cross members that are required to attach the transverse torque rods.

SUMMARY OF THE INVENTION

A vehicle suspension includes an X-linkage with a first set of legs rigidly attached to an axle and a second set of legs pivotally attached to frame hangers.

In one example, the X-linkage is a single-piece component that includes a central body portion with the first set of legs extending outwardly from the central body portion in one longitudinal direction and with the second set of legs extending outwardly from the central body portion in an opposite longitudinal direction to form an X-shape.

In one example, the first set of legs each include a plate portion that is mounted to an upper surface of the axle and the second set of legs each include a bushing mount to be secured to the frame hangers.

In one example, the axle comprises an I-beam for a front non-drive steer axle.

These and other features of the present invention can be best understood from the following specification and drawings, the following of which is a brief description.

DETAILED DESCRIPTION OF THE PREFERRED EMBODIMENT

Figure 1:
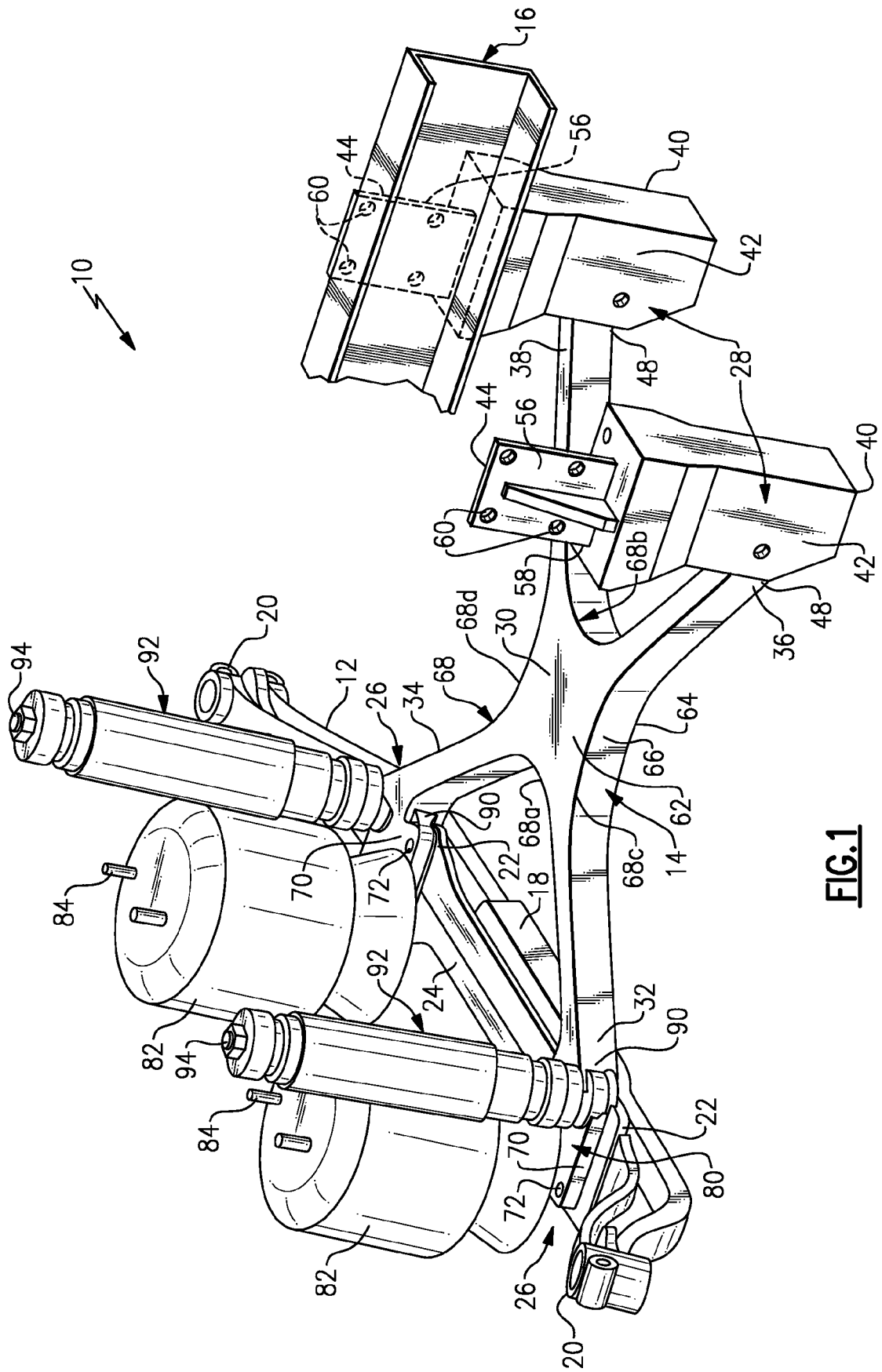
FIG. 1 is a perspective view of an axle and suspension assembly incorporating the subject invention.

FIG. 1 shows an axle and suspension assembly 10 that includes an axle 12 and an X-linkage 14 that is used to connect the axle 12 to a vehicle frame 16. In the example shown, the axle 12 comprises a front non-drive steer axle having a beam body 18 that extends in a lateral direction between opposed ends 20. Each of the opposed ends 20 comprises a knuckle attachment point to be secured to a steer knuckle.

The beam body 18 comprises an I-section and includes axle plate portions 22 formed on an upper surface 24 of the beam body 18. It should be understood that while the X-linkage 14 is shown with a non-drive steer axle having an I-section shape, the X-linkage could also be used with other types of axles and/or with axles having different cross-section shapes.

The X-linkage 14 is a single-piece, rigid plate component that has a central body portion 30, first 32 and second 34 legs extending outwardly from the central body portion 30 in a first longitudinal direction, and third 36 and fourth 38 legs extending outwardly from the central body portion 30 in a second longitudinal direction opposite from the first longitudinal direction. The first 32 and second 34 legs are attached to the beam body 18 at a first connection interface 26. The third 36 and fourth 38 legs are attached to frame hangers 40 at a second connection interface 28. The frame hangers 40 are fixed to the vehicle frame 16. The first connection interface 26 comprises a rigid connection between the X-linkage 14 and the beam body 18 and the second connection interface 28 comprises a pivotal connection between the X-linkage 14 and the frame hangers 40.

Figure 2:
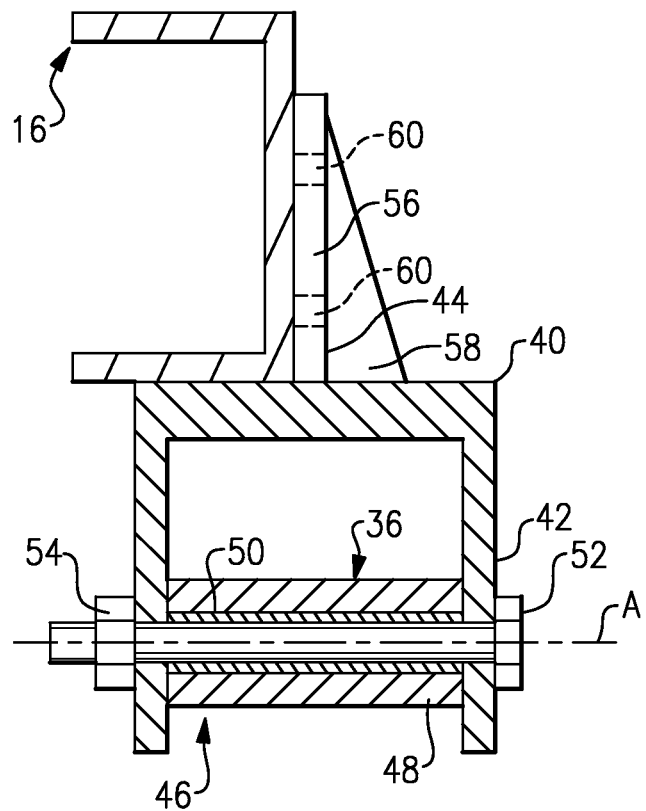
FIG. 2 is an end view of a frame hanger and X-linkage pivot connection.

The frame hangers 40 each comprise a box-shape structure that has a bushing mount portion 42 and a frame mount portion 44. The box-shape structure has an opening 46 that receives one of the distal ends 48 of the third 36 and fourth 38 legs as shown in FIG. 2. The distal ends 48 each include a bore that receives a bushing 50. A bolt 52 is inserted in the bushing 50 to pivotally secure the distal ends 48 to the frame hanger 40 at the bushing mount portion 42. A nut 54 tightens the bolt 52 and clamps the bushing 50 to the frame hanger 40. Each of the third 36 and fourth 38 legs pivots about a respective pivot axis A relative to the frame hanger 40.

The frame mount portion 44 includes a vertically extending plate 56 and brace element 58. The plate 56 includes openings 60 that receive fasteners to secure the frame hanger 40 to the vehicle frame 16.

Figure 3:
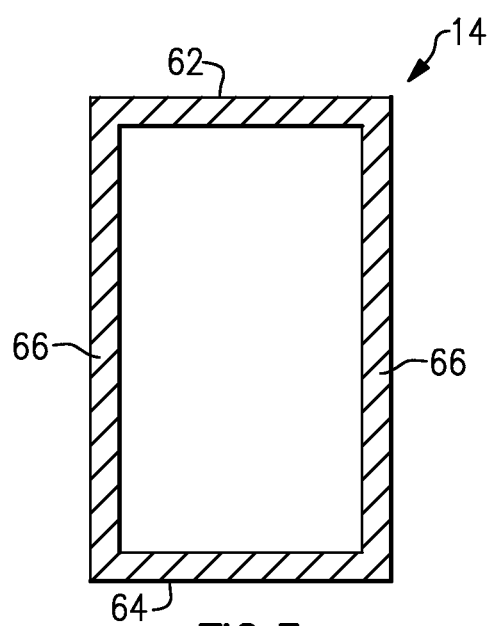
FIG. 3 is a cross-sectional view of one example of a leg cross-section as used in an X-linkage.

As shown in FIG. 1, the X-linkage 14 comprises a single-piece, rigid plate component that includes an upper plate portion 62 and a lower plate portion 64 spaced apart from the upper plate portion 62. In one example, vertically extending wall portions 66 extend downwardly from the upper plate portion 62 to the lower plate portion 64 to form a box shape, such as that shown in FIG. 3. It should be understood that while FIG. 3 shows an example of a rectangular tube section, other section shapes could also be utilized.

The X-linkage 14 includes curved surfaces 68 that transition between the arms 32, 34, 36, 38. A first curved surface 68a transitions between the first 32 and second 34 arms and a second curved surface 68b transitions between the third 36 and fourth 38 arms. The first 68a and second 68b surfaces are longitudinally spaced apart from each other. A third curved surface 68c transitions between the first 32 and third 36 legs and a fourth curved surface 68d transitions from the second 34 to the fourth 38 leg. The third 68c and fourth 68d curved surfaces are laterally spaced apart form each other. This shape provides a compact suspension configuration with good roll and lateral stiffness characteristics.

The first connection interface 26 comprises a rigid mount to the axle 12 such that there is no relative movement between the first 32 and second 34 legs and the axle 12. The first 32 and second 34 legs each include an integrally formed plate portion 70 that rests directly upon the axle plate portions 22 formed as part of the upper surface 24 of the beam body 18. In one example, the plate portions 70 include mounting structure, such as holes 72, which receive fasteners to fix the X-linkage 14 to the axle 12. In another example, the plate portions 70 are welded to the axle 12.

The X-linkage 14 can also include air spring mount portions 80 to support air springs 82 at a position between the vehicle frame 16 and the axle 12. In one example, the air spring mount portions 80 could be formed as part of the plate portions 70. Optionally, separate plates could be attached to the X-linkage 14 or axle to provide an air spring mount. As shown in FIG. 1, the air springs 82 are positioned directly over, i.e. are directly vertically above, the beam body 18. The air springs 82 include mounting structure 84 to secure the air springs 82 to the vehicle frame 16. This provides a compact and lightweight configuration.

The X-linkage 14 can also include shock absorber mount portions 90 to secure shock absorbers 92 between the vehicle frame 16 and the X-linkage 14. In the example shown, the shock absorber mount portions 90 are formed at a transition area between the plate portions 70 and the first 32 and second 34 arms. The shock absorber mount portions 90 are formed as outwardly extending bosses and are directly connected to the shock absorbers 92. The shock absorbers 92 include mounting structure 94 to allow the shock absorbers 92 to be secured to the vehicle frame 16.

Section geometry, length and width of the X-linkage 14 together with stiffness properties of the bushings 50 define the mechanical properties of the X-linkage 14. The combination of the X-linkage geometry and bushing properties provide secondary roll stiffness and lateral stiffness to the suspension system as opposed to prior configurations which required additional roll bars to provide secondary roll stiffness and transverse torque rods to provide lateral stiffness. Thus, the subject X-linkage 14 provides a simpler and more light-weight configuration.

Primary roll stiffness and low vertical rate (frequency) of the suspension system is achieved through the air springs 82 being mounted to the axle 12. The air springs 82 can be mounted at various positions on the axle, i.e. can be varied in position longitudinally and transversely, which determine the load carried by the air spring and the vertical rate or frequency characteristics of the suspension system. One advantage of using air springs as opposed to mechanical systems for front axles involves achieving a low vertical rate, i.e. frequency or smooth ride, as well as keeping ride height constant under various static load conditions.

The X-linkage 14 can be positioned ahead of the axle 12, i.e. trailing arm configuration, or behind the axle 12, i.e. leading arm configuration. The location of the X-linkage 14 is strongly influenced by the location of an engine oil pan. The X-linkage 14 is located on an opposite side of the axle 12 from where the engine oil pan would be located so that the X-linkage 14 has sufficient room to move up and down.

The leading arm configuration has the benefit of clearing a chassis section at a front of the axle 12 because there are no other suspension elements attached to the vehicle frame 16 ahead of the axle 12. This allows this space to be used for other vehicle components. Another advantage with the leading arm configuration of the X-linkage 14 in combination with a specified air spring position on the axle is the benefit of minimized brake diving.

The subject X-linkage 14 configuration also offers significant advantages over prior suspension systems. The X-linkage 14 provides the suspension system with adequate roll and lateral stiffness, and one main advantage is that it eliminates the use of multiple links (longitudinal and transverse torque rods), roll bars, and cross members to result in a system that is less complex and which has fewer components than prior systems. It should be understood that special chassis constructions may require the addition of a transverse torque rod and X-member to avoid sustained vibration conditions on the front axle such as shimmy or tramping modes.

Also, as discussed above, the X-linkage 14 minimizes brake diving. When used on a leading arm configuration, i.e. the X-linkage 14 being behind the axle 12, vehicle pitch caused by braking is minimized.

Further, the subject system uses air springs 82 that are pressurized to carry the load of the vehicle under empty and loaded conditions. The air springs 82 in combination with the X-linkage 14 provide a constant ride height regardless of the load condition.

Finally, the subject suspension system does not use a cross member, transverse torque rod, or long spring leaves, which makes the suspension very compact when compared to prior suspensions. When used in a leading arm configuration it also frees up packaging space at the front of the chassis which can now be used for larger cooling systems and engines.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle suspension comprising:
   X-linkage having a first pair of legs with a first connection interface to be attached to an axle and a second pair of legs with a second connection interface to be attached to a frame, and wherein said first connection interface corn rises a fixed attachment and said second wherein said first connection interface comprises first and second plates to be positioned in an overlapping relationship with an axle beam;
   wherein said second connection interface comprises first and second bushings coupled to first and second frame hangers to provide pivotal movement between said X-linkage and the frame.

2. An axle and suspension assembly comprising:
   an axle beam extending in a lateral direction;
   an X-linkage having a central body portion with first and second legs extending outwardly from said central body portion in a first longitudinal direction and third and fourth legs extending outwardly from said central body portion in a second longitudinal direction opposite of said first longitudinal direction to form an X-shape; and
   wherein said first and said second legs are fixed to said axle beam at first and second connection interfaces and wherein said third and said fourth legs include respective third and fourth connection interfaces for pivotal attachment to a vehicle frame such that said third and fourth legs are pivotable at said third and fourth connection interfaces about a laterally extending axis.

3. The axle and suspension assembly according to claim 2 wherein said first and said second connection interfaces each comprise a plate that is fixed directly to an upper surface of said axle beam, and wherein said third and said fourth connection interfaces each comprise a bushing with a laterally extending bore that defines said laterally extending axis.

4. The axle and suspension assembly according to claim 3 including first and second frame hangers that are connected to said third and said fourth legs with said bushings.

5. An axle and suspension assembly comprising:
   an axle beam extending in a lateral direction;
   an X-linkage having a central body portion with first and second legs extending outwardly from said central body portion in a first longitudinal direction and third and fourth legs extending outwardly from said central body portion in a second longitudinal direction opposite of said first longitudinal direction to form an X-shape;
   wherein said first and said second legs are fixed to said axle beam at first and second connection interfaces and wherein said third and said fourth legs include respective third and fourth connection interfaces for pivotal attachment to a vehicle frame;
   wherein said first and said second connection interfaces each comprise a plate that is fixed directly to an upper surface of said axle beam, and wherein said third and said fourth connection interfaces each comprise a bushing; and
   wherein said first and said second legs each include at least one of an air spring mount with first and second air springs fixed to said air spring mounts and a shock absorber mount with first and second shock absorbers that are fixed to said shock absorber mounts.

6. The axle and suspension assembly according to claim 5 wherein said first and said second legs each include said shock absorber mount and said air spring mount.

7. The axle and suspension assembly according to claim 3 wherein said axle beam comprises an I-beam with first and second knuckle attachment bosses at opposed lateral ends to receive steering knuckles.

8. The axle and suspension assembly according to claim 3 wherein said X-linkage comprises a single-piece body that includes an upper plate portion, a lower plate portion spaced vertically below said upper plate portion and vertical walls extending between said upper and said lower plate portions to form a box-shaped section.

9. The axle and suspension assembly according to claim 2 wherein said X-linkage comprises a single-piece rigid plate component with said central body portion being longitudinally spaced from said first, second, third, and fourth connection interfaces such that said single-piece rigid plate component is only connected to said axle beam and vehicle frame via said first, second, third, and fourth legs.

10. The vehicle suspension according to claim 2 wherein said central body portion is free from attachment to any other structure.

11. The vehicle suspension according to claim 2 wherein said X-linkage comprises a single-piece body, and wherein said first and second connection interfaces comprise a generally flat plate that extends to overlap an upper surface of said axle beam.

12. The vehicle suspension according to claim 11 wherein said flat plate includes at least one additional mount interface configured to support a suspension component.

* * * * *